(12) United States Patent
Murayama

(10) Patent No.: US 7,166,350 B2
(45) Date of Patent: Jan. 23, 2007

(54) RESIN MOLDED COMPONENT FOR A VEHICLE AND MANUFACTURING APPARATUS FOR SAME

(75) Inventor: Takuya Murayama, Yokohama (JP)

(73) Assignee: Altis Hashimoto Co., Ltd., Kanagawa-ken (JP)

( * ) Notice: Subject to any disclaimer, the term of this patent is extended or adjusted under 35 U.S.C. 154(b) by 135 days.

(21) Appl. No.: 10/810,197

(22) Filed: Mar. 26, 2004

(65) Prior Publication Data
US 2004/0191475 A1    Sep. 30, 2004

(30) Foreign Application Priority Data
Mar. 31, 2003    (JP)    ............................... 2003-096338

(51) Int. Cl.
*B32B 3/24* (2006.01)
*B60R 19/24* (2006.01)
(52) U.S. Cl. .................... 428/131; 428/99; 293/155
(58) Field of Classification Search ................ 428/131, 428/99; 293/155
See application file for complete search history.

(56) References Cited

U.S. PATENT DOCUMENTS

| 3,310,929 A | * | 3/1967 | Garvey | ........................ | 24/295 |
| 2003/0052515 A1 | | 3/2003 | Barnard et al. | | |

FOREIGN PATENT DOCUMENTS

| FR | 2 668 436 | 4/1992 |
| JP | 62-289449 | 12/1987 |

* cited by examiner

Primary Examiner—William P. Watkins, III
(74) Attorney, Agent, or Firm—Thelen Reid Brown Raysman & Steiner LLP; David B. Ritchie

(57) ABSTRACT

There is provided a resin molded component in which it is difficult for molding defects such as sink marks and welds and the like to occur in the design surface, and an apparatus for manufacturing the same. A resin molded component for a vehicle, in which a molded component body having a design surface that forms an exterior surface when mounted on a vehicle body is formed integrally with a mounting portion that is formed so as to protrude from a rear surface that is on an opposite side from the design surface of the molded component body, includes a mounting seat portion that is provided at a position separated from the molded component body by an inner space that communicates from an aperture portion formed in a direction orthogonal to a longitudinal direction of the resin molded component, a joining portion that joins the molded component body with the mounting seat portion at a position opposite the aperture portion, and side walls that surround a periphery of the inner space apart from the aperture portion and the joining portion, and that are separated from the molded component body by slit shaped hole portions that extend from the joining portion to an edge on the aperture portion side or to the vicinity thereof.

3 Claims, 4 Drawing Sheets

RESIN MOLDED COMPONENT FOR A VEHICLE AND MANUFACTURING APPARATUS FOR SAME

BACKGROUND OF THE INVENTION

1. Field of the Invention

Priority is claimed on Japanese application No. 2003-96338, filed Mar. 31, 2003, the content of which is incorporated herein by reference.

The present invention relates to a resin molded component for a vehicle formed by integrating a molded component body having a design surface that forms an exterior surface when the resin molded component is mounted on a vehicle body with a mounting portion that is formed so as to protrude from a rear surface that is on an opposite side from the design surface of the molded component body, and to a manufacturing apparatus for the same.

2. Description of Related Art

Conventionally, in order to mount a resin molded component for a vehicle that has a design surface as an exterior surface on a vehicle body, a substantially box-shaped mounting portion held by a mounting member such as a screw or the like is provided so as to protrude from a rear surface of the molded component body on the opposite side from the design surface, and in such a manner that, when the molded component body is mounted on the vehicle, the mounting portion is not exposed to the vehicle exterior side of the resin molded component.

In this type of resin molded component, gaps are formed in a connection portion where the mounting portion is connected to the molded component body, and thermal expansion of the mounting portion that occurs during resin molding and the like is absorbed by the gaps, thereby suppressing the occurrence of molding defects such as sink marks and the like. For example, in Japanese Patent Application Laid-Open (JP-A) No. 62-289449, a structure is disclosed in which a reinforcing wall that blocks off a box portion (i.e., a mounting portion) is formed integrally with an end surface on the opposite side from a retainer insertion portion (i.e., an aperture portion) of the box portion, and slits (i.e., gaps) are provided between this reinforcing wall and a rear surface of the molded component body (i.e., a bumper). One method of forming this type of mounting portion involves using a slide mold that can be attached or removed by being slid in a direction of the aperture portion of the mounting portion.

However, if, for example, protrusions such as reinforcing ribs or display portions that display trade names, component numbers and the like by embossing or the like are located closer to the center portion in the longitudinal direction of the resin molded component than the mounting portion, then it may not be possible to design the aperture portion used for removing the slide mold from the mounting portion so that it faces the protrusions. Moreover, if edges of both end portions in the longitudinal direction of the resin molded component are configured so as to protrude towards the rear surface side of the resin molded component in the manner of the portions of the two end portions of the radiator grill that approach the headlamps, and mounting portions are provided in the vicinity of these protruding edges, then, in this case as well, it may not be possible to design the aperture portions of the mounting portions so that they face the protruding edges. Furthermore, if the resin molded component is designed having, for example, a bow shaped configuration in the vicinity of the center portion in the longitudinal direction of the resin molded component so as to protrude towards the design surface side, and if a mounting portion is provided in the center portion in the longitudinal direction, then, in some cases, it may not be possible to remove the slide mold from the mounting portion regardless of which direction in the longitudinal direction the aperture portion of the mounting portion is facing towards.

In this way, due to the design restrictions on the resin molded component, it may become necessary to face the aperture portion of the mounting portion in a transverse direction that is orthogonal to the longitudinal direction. However, in this case, because the side walls of the mounting portion end up being positioned to the left and right of the aperture portion, resin ends up flowing in a direction perpendicular to the normal resin flow direction (typically, this is the longitudinal direction of the resin molded component) in portions forming the side walls of the mounting portion. As a result, the problem arises that molding defects such as sink marks and welds and the like are easily generated in the vicinity of the mounting portion. In particular, in the case of a resin molded component in which a high degree of decorativeness is aimed for by the provision of a glossy layer formed by a metallic thin film on the design surface using a plating, deposition, or sputtering method or the like, fine linear grooves or minute distortions in the design surface caused by molding defects tend to stand out. Consequently, the aesthetics and decorativeness deteriorate remarkably and a solution to this problem is desired.

Accordingly, it is an object of the present invention to provide a resin molded component in which it is difficult for molding defects such as sink marks and welds and the like to occur in the design surface, and to provide a manufacturing apparatus for the same.

SUMMARY OF THE INVENTION

In order to solve the above problems, the present invention provides a resin molded component for a vehicle in which a molded component body having a design surface that forms an exterior surface when mounted on a vehicle body is formed integrally with a mounting portion that is formed so as to protrude from a rear surface that is on an opposite side from the design surface of the molded component body, wherein the mounting portion comprises: a mounting seat portion that is provided at a position separated from the molded component body by an inner space that communicates from an aperture portion formed in a direction orthogonal to a longitudinal direction of the resin molded component; a joining portion that joins the molded component body with the mounting seat portion at a position opposite the aperture portion; and side walls that surround a periphery of the inner space apart from the aperture portion and the joining portion, and that are separated from the molded component body by slit shaped hole portions that extend from the joining portion to an edge on the aperture portion side or to the vicinity thereof.

In this resin molded component for a vehicle, it is preferable that thicknesses of the side walls gradually become thinner closer to edges of the side walls that open onto the hole portion, and that inner surfaces that open onto the inner space of the mounting portion and outer surfaces of the side walls are joined at the edges at an obtuse angle.

Furthermore, the present invention provides a resin molded component for a vehicle formed by injecting molten resin into a cavity enclosed by a first die and second die positioned facing each other, and by a third die that is positioned between the first die and second die such that a portion of the third die is in contact with an inner surface of the second die, wherein: the design surface is formed by an inner surface of the first die; the resin molded component is formed by a cavity formed between the first die and the second die or third die; and the slit shaped hole portions can be formed by portions where the second die and the third die are in contact.

In addition, the present invention provides an apparatus for manufacturing the resin molded component for a vehicle, wherein the apparatus includes a first die having an inner surface that forms a design surface of the molded component, a second die that is positioned facing the first die, and a third die that is positioned between the first die and second die and that forms an inner space of the mounting portion, a portion of the third die is in contact with an inner surface of the second die, a cavity into which molten resin that forms the molded component body is injected is formed between the first die and the second die or third die, a cavity into which molten resin that forms the mounting portion is injected is formed between the second die and the third die, and the slit shaped hole portions are formed in portions where the second die and the third die are in contact.

In this apparatus for manufacturing the resin molded component for a vehicle, it is possible for the third die to have a pressure receiving surface that receives pressing force from the second die.

BRIEF DESCRIPTION THE DRAWINGS

FIG. 2(a) is a perspective view as seen from the mounting seat surface side, while

Figure 4A:
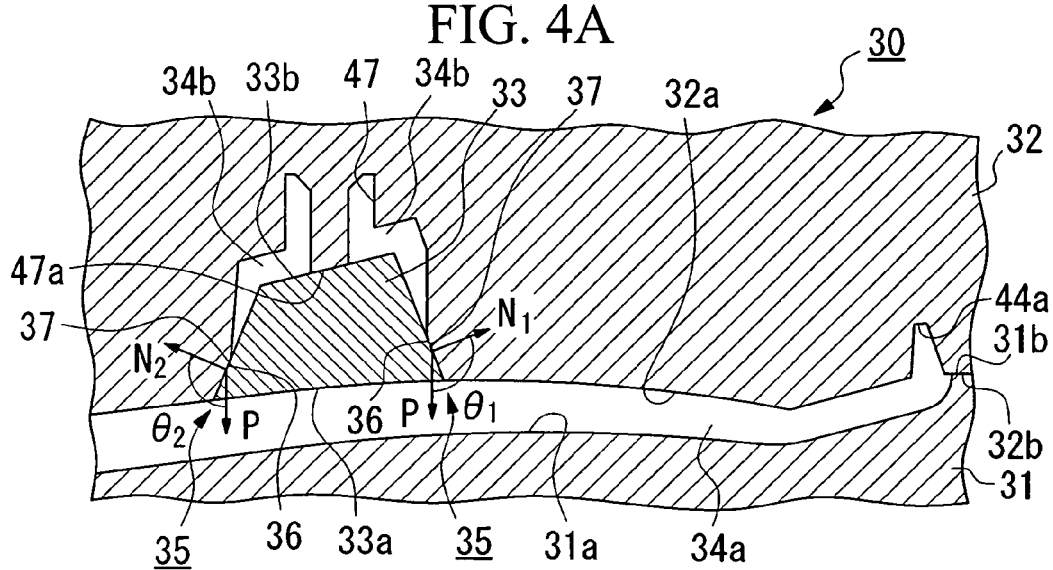
Figure 4B:
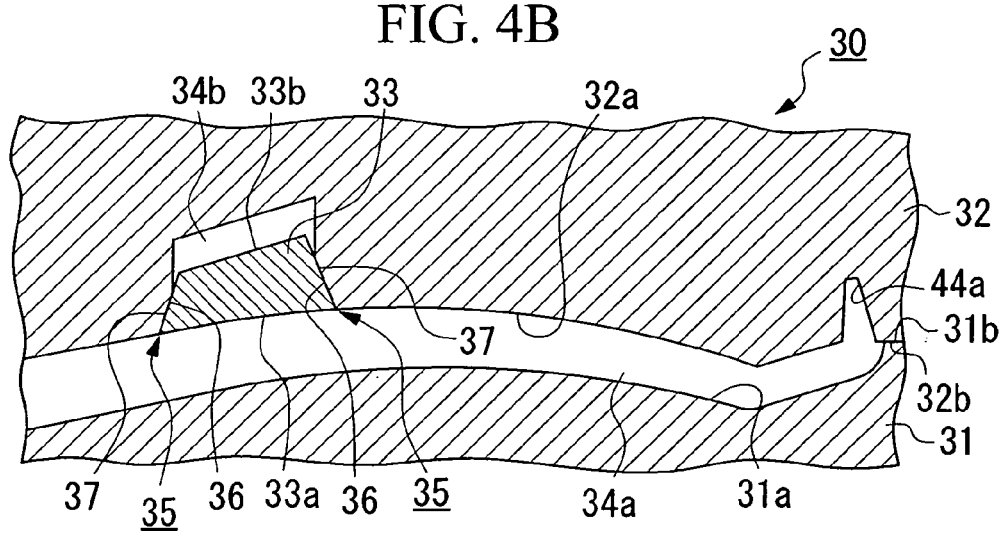
Figure 4C:
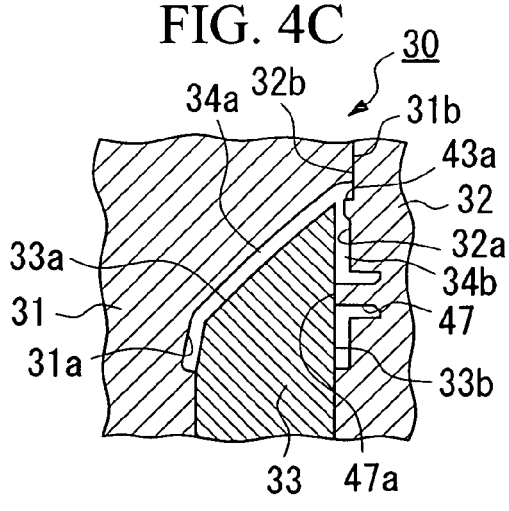
Figure 4D:
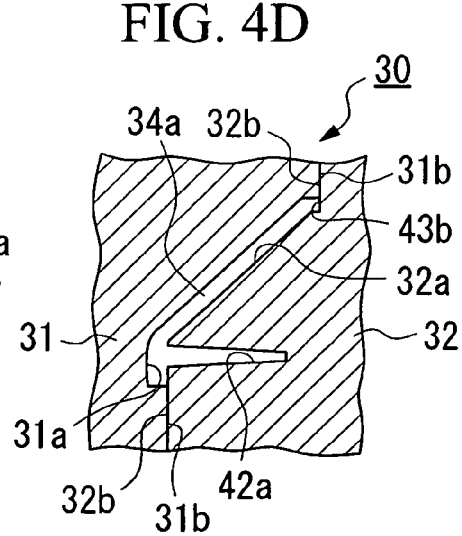

FIG. 4 is a view for explaining a manufacturing apparatus that manufactures the resin molded component for a vehicle shown in FIG. 1, FIG. 4(a) is a cross-sectional view taken along the line A—A of the resin molded component for a vehicle shown in FIG. 1, FIG. 4(b) is a cross-sectional view taken along the line B—B thereof, FIG. 4(c) is a cross-sectional view taken along the line C—C thereof, and FIG. 4(d) is a cross-sectional view taken along the line D—D thereof.

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

The present invention will now be described in detail based on the embodiments.

Figure 1A:
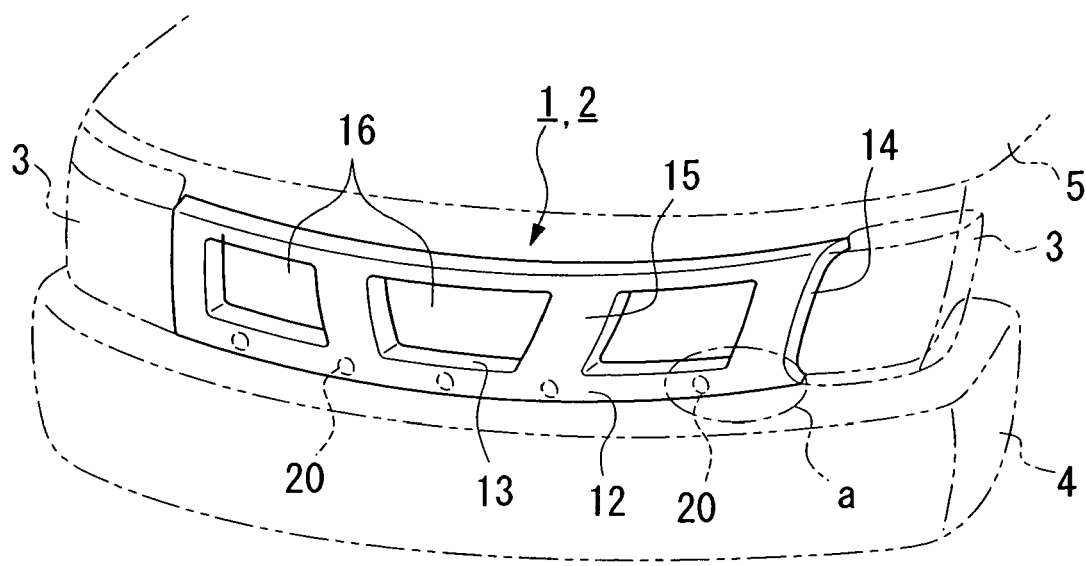
FIG. 1(a) is a perspective view showing an example of a resin molded component for a vehicle of the present invention.
Figure 1B:
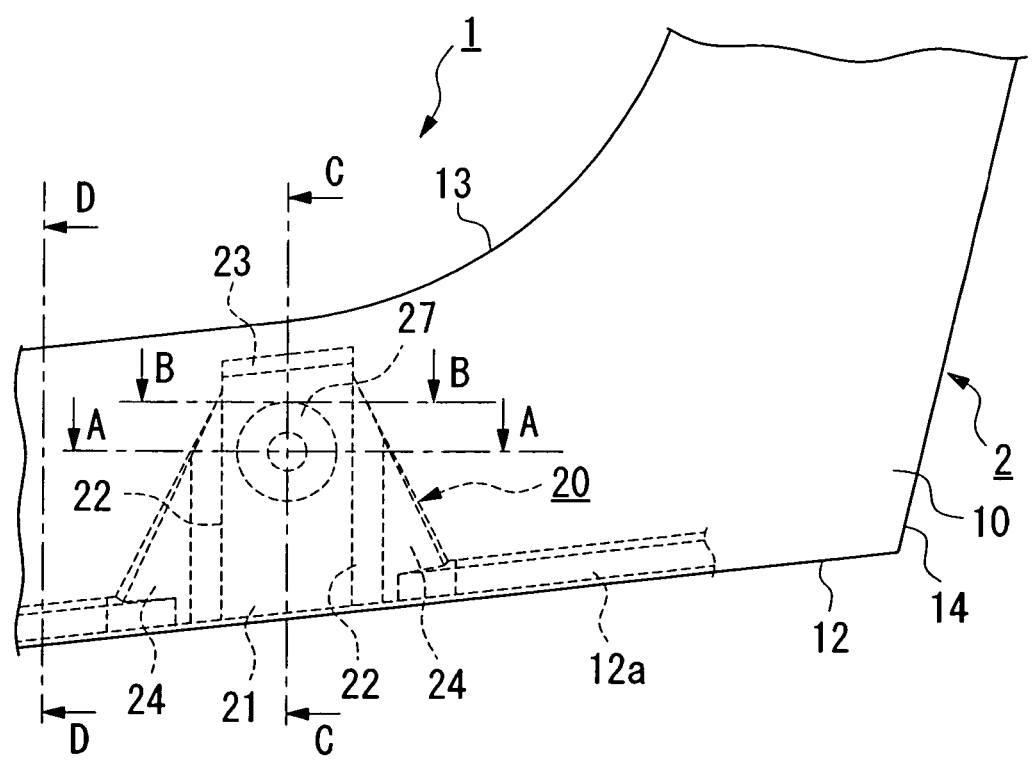
FIG. 1(b) is an enlarged frontal view as seen from the front of a portion of FIG. 1(a).

FIG. 1(a) is a perspective view showing an example of a radiator grill serving as the resin molded component for a vehicle of the present invention. FIG. 1(b) is an enlarged frontal view of a portion (a) of FIG. 1(a).

Figure 2A:
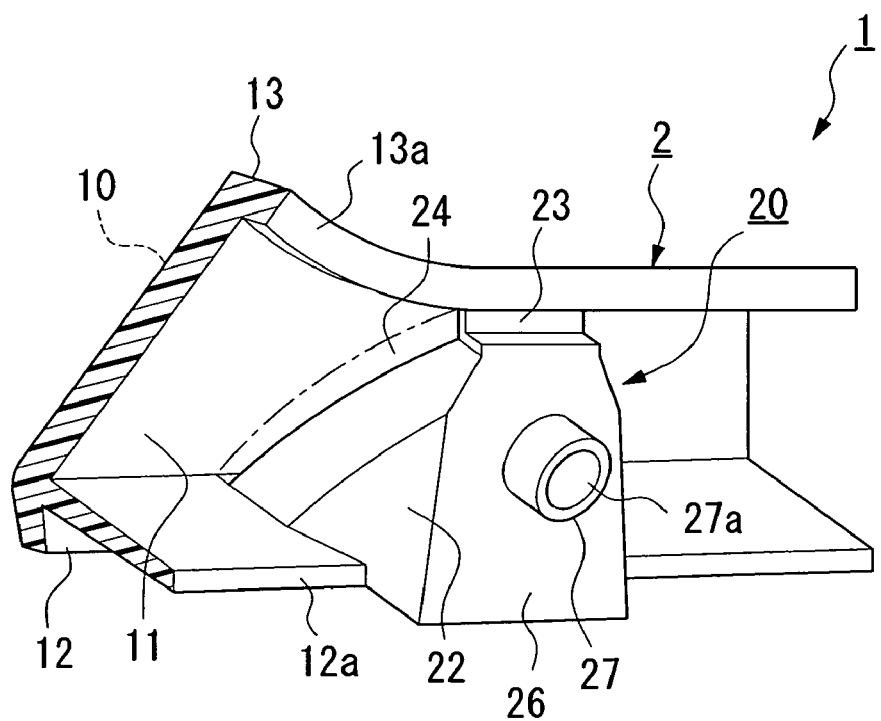
FIG. 2(a) shows an example of a mounting portion according to the molded resin component for a vehicle of FIG. 1.
Figure 2B:
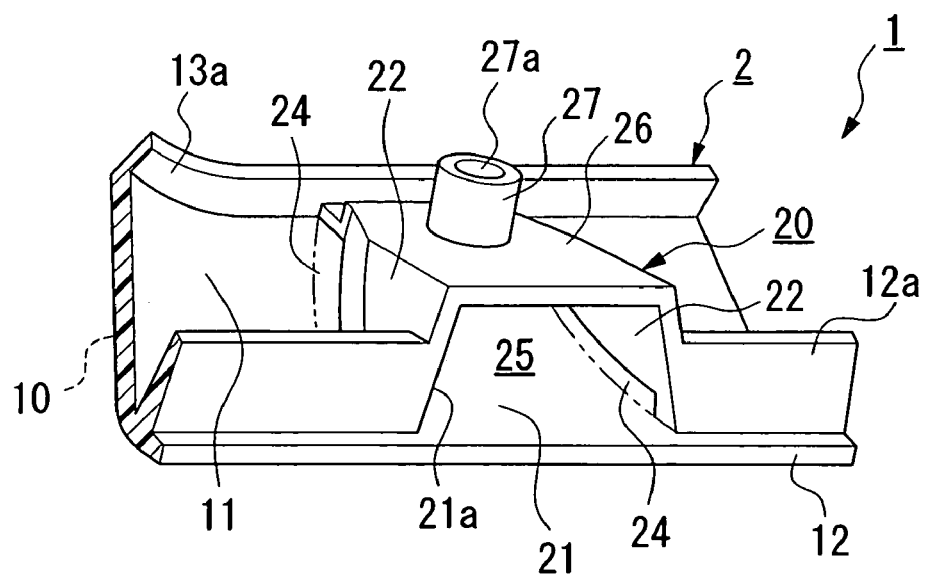
FIG. 2(b) is a perspective view seen from the aperture portion side.

FIG. 2(a) shows an example of a mounting portion according to the radiator grill of FIG. 1. FIG. 2(a) is a perspective view of this as seen from the mounting seat surface side, while FIG. 2(b) is a perspective view of this seen from the aperture portion side.

Figure 3A:
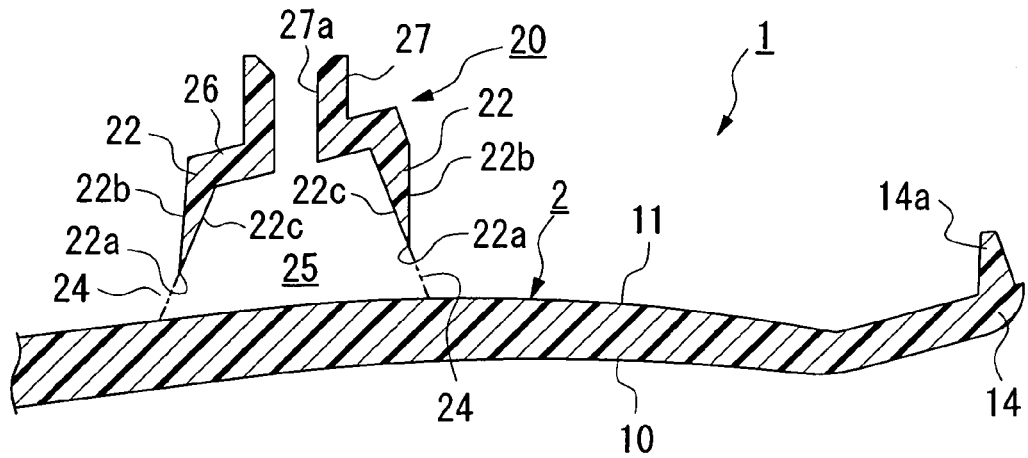
FIG. 3(a) is a cross-sectional view taken along the line A—A of the resin molded component for a vehicle shown in FIG. 1.
Figure 3B:
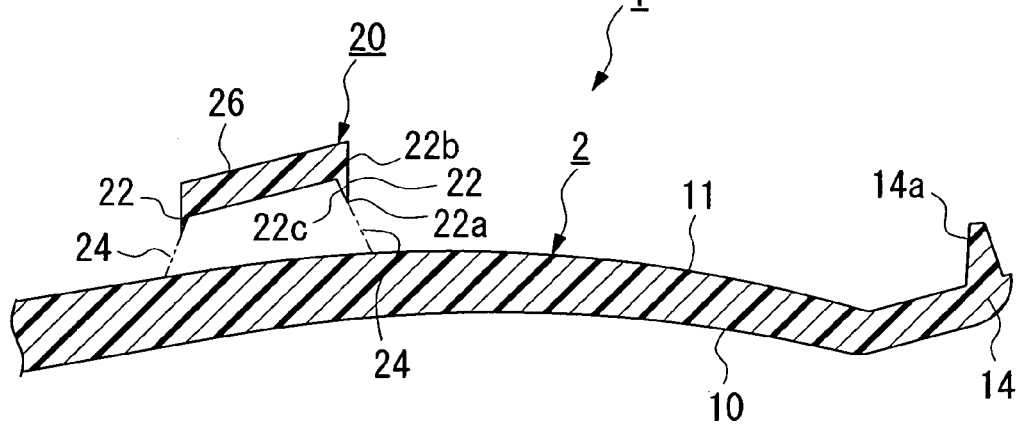
FIG. 3(b) is a cross-sectional view taken along the line B—B thereof.
Figure 3C:
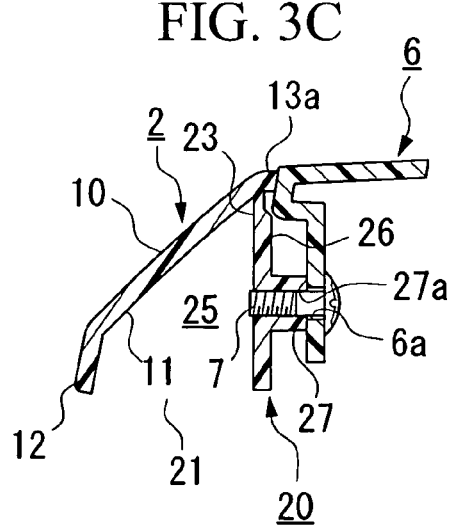
FIG. 3(c) is a cross-sectional view taken along the line C—C thereof.
Figure 3D:
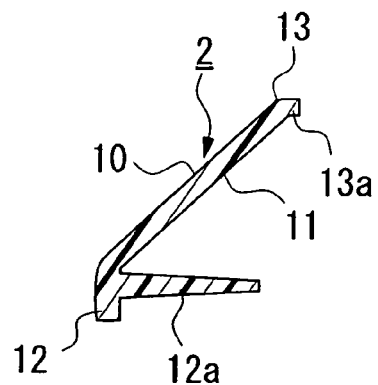
FIG. 3(d) is a cross-sectional view taken along the line D—D thereof.

FIG. 3(a) is a cross-sectional view taken along the line A—A of the radiator grill shown in FIG. 1, FIG. 3(b) is a cross-sectional view taken along the line B—B thereof, FIG. 3(c) is a cross-sectional view taken along the line C—C thereof, and FIG. 3(d) is a cross-sectional view taken along the line D—D thereof.

FIG. 4 is a cross-sectional view showing principal portions of a molding die of a manufacturing apparatus that manufactures the radiator grill shown in FIG. 1, FIG. 4(a) is a cross-sectional view taken along the line A—A thereof, FIG. 4(b) is a cross-sectional view taken along the line B—B thereof, FIG. 4(c) is a cross-sectional view taken along the line C—C thereof, and FIG. 4(d) is a cross-sectional view taken along the line D—D thereof.

As is shown in FIGS. 1(a) and 1(b), a radiator grill 1 (i.e., the resin molded component for a vehicle) is a resin molded component formed by a lattice-shaped grill body (i.e., a molded component body) 2 formed substantially as a horizontally elongated plate having vertical upright portions 15 that inhibit the ingress of items into the interior and air intake apertures 16 that are formed between the vertical upright portions 15 and that allow the intake of air, and by mounting portions 20 that are formed protruding from a rear surface 11 of the grill body 2 and that mounts the radiator grill 1 on a second molded component 6 that is located on the vehicle body side of the radiator grill 1. The grill body 2 and the mounting portions 20 are molded integrally with each other.

The radiator grill 1 is formed by integral molding from a synthetic resin such as an acrylonitrile—butadiene—styrene copolymer (ABS), polybarbonate (PC), polypropylene (PP), a PC/ABS polymer alloy, and the like. The outer surface on the vehicle front side of the radiator grill 1 is a design surface 10 on which is provided a glossy layer (not shown) formed by a metallic thin film by plating, vapor deposition, sputtering, or the like. Examples of the metal used to form the metallic thin film include aluminum, chrome, and the like.

A bottom edge portion 12 of the grill body 2 of the radiator grill 1 is in contact with a top edge of a front bumper 4, and covers a front surface of a radiator (not shown) located in an engine room under a hood 5. The radiator grill 1 is mounted between headlamps 3 such that the design surface 10 faces the front of the vehicle (i.e., the vehicle exterior side; towards a viewer of FIG. 1).

In this case, mounting portions 20 are provided at a plurality of locations in the vicinity of the bottom edge portion 12 of the radiator grill 1 and extending in the longitudinal direction thereof (i.e., in the transverse direction of the vehicle). The number and mounting locations of the mounting portions 20 are not particularly restricted.

As is shown in FIGS. 2 and 3, reinforcing ribs 12a, 13a, and 14a are formed protruding from the rear surface 11 side in bottom edge portions 12, inner peripheral portions 13, and side edge portions 14 and the like of the grill body 2.

As is shown in FIG. 1(b) and FIG. 2, the mounting portions 20 are provided with: an aperture portion 21 that is secured facing downwards (i.e., downwards in FIG. 1 (b)) when the radiator grill 1 is mounted on the vehicle body; a mounting seat portion 26 that is provided at a position separated from the grill body 2 by an inner space 25 that continues on from the aperture portion 21; a joining portion 23 that joins the rear surface 11 of the molded component body 2 with the mounting seat portion 26 at a position opposite the aperture portion 21; and side walls 22 and 22 that surround the periphery of the inner space 25 apart from the aperture portion 21 and the joining portion 23, and that are separated by slit shaped hole portions 24 from the grill body 2.

Here, the side walls 22 and 22 are provided as a pair at positions facing each other across the inner space 25 and the mounting seat portion 26. The hole portions 24 are formed between each side wall 22 and the rear surface 11 of the grill body 2.

A boss 27 having a mounting hole 27a is provided on the mounting seat portion 26 as a mounting structure used to mount the resin molded component for a vehicle 1 onto the vehicle body. As is shown in FIG. 3(c), by screwing a mounting member 7 (in the drawing this is a male screw) into the mounting holes 27a and 6a provided in the mounting seat portion 26 and in another molded component 6, the radiator grill 1 can be mounted on the other molded component 6 located on the vehicle inner side of the radiator grill 1.

Note that it is possible to tap a screw thread on an inner surface of the mounting hole 27. Alternatively, if a self-tapping screw is used as the mounting member 7 the screw thread does not need to be tapped.

The side walls 22 and 22 are joined to the joining portion 23 and the mounting seat portion 26, and are also joined to the reinforcing rib 12a at an edge 21a of the aperture portion 21.

The thickness of the side walls 22 becomes thinner towards edges 22a that open onto the hole portions 24. An outer surface 22b and an inner surface 22c of each side wall 22 are connected via an acute angle at the edges 22a on the hole portion 24 side.

The reinforcing ribs 12a protruding from the rear surface 11 of the bottom edge portion 12 of the molded component body 2 is not formed in the area of the aperture portion 21, and is joined to the side walls 22 at the edges 21a of the aperture portion 21.

This type of radiator grill 1 can be manufactured by a resin molding apparatus and method that use molding dies such as an injection molding method. FIGS. 4(a) to 4(d) are cross-sectional views showing principal parts of a molding die 30 used in an apparatus for manufacturing the radiator grill 1. As is shown in these drawings, the molding die 30 is provided with a first die 31, a second die 32 positioned opposite the first die 31, and a third die 33 positioned between the first die 31 and the second die 32.

Specific configurations of the respective dies 31, 32, and 33 that form the molding die 30 can be appropriately designed to meet the specific application, configuration, and material of the resin molded component for a vehicle 1. However, at least the molding die 30 is formed such that a cavity 34a, into which the molten resin that ultimately forms the molded component body 2 is injected, is formed between the first die 31 and the second and third dies 32 and 33, a cavity 34b, into which the molten resin that ultimately forms the mounting portion 20 is injected, is formed between the second die 32 and the third die 33, and the hole portion 24 is formed in a portion 35 where the second die 32 and the third die 33 are in contact.

Here, the first die 31 is a fixed type of die and has an inner surface 31a used to form the design surface 10 of the molded component body 2. The second die 32 is the movable side die and is able to move in a direction facing the first die 31 (i.e., in a vertical direction in FIGS. 4(a) and 4(b)). When a matching surface 32b of the second die 32 is placed against a matching surface 31b of the first die 31, cavities (i.e., gaps) 34a and 34b are formed between the first die 31 and the second die 32.

When the dies are fastened together, as is shown in FIG. 4(c), the cavity 34a is formed between the inner surface 31a of the first die 31 and the surface 33a of the third die 33 on the side facing the first die 31. The cavity 34b is formed between the inner surface 32a of the second die 32 and the surface 33b of the third die 33 on the side facing the second die 32. The cavity 34a and the cavity 34b are connected to each other.

The inner surface 32a of the second die 32 has concave portions 42a, 43a, and 44a in the rear surface 11 of the molded component body 2 for placing the reinforcing ribs 12a, 13a, and 14a, and has a jagged portion 47 in the mounting seat portion 26 for placing the boss 27. A withdrawal gradient can be set for the concave portions 42a, 43a, and 43a and the jagged portion 47 in order to ease the removal of the molded component. The convex end 47a of the jagged portion 47 is in contact with a portion of the front surface 33b of the third die 33 when the dies are fastened together, and here the mounting hole 27a is formed.

In addition, although not shown, it is also possible to provide where necessary irregularities that form embossed display portions and the like that display trade names, component numbers and the like on the inner surface 32a of the second die 32.

The third die 22 is a slide die that is mounted on the second die 32 side so as to be able to move by sliding between the first die 31 and the second die 32. The third die 22 is provided in order to secure the inner space 25 of the mounting portion 20. When manufacturing a resin molded component for a vehicle 1 having a plurality of mounting portions 20, a plurality of third dies 33 can be provided to match the number of mounting portions.

The direction of movement of the third die 33 is perpendicular to the direction of movement of the second die 32. Specifically, when the second die 32 is made to approach the first die 31, the surface of the third die 33 moves in a direction in which it approaches the inner surface 32a of the second die 32 (i.e., a direction moving forwards from the rear of the drawings in FIGS. 4(a) and 4(b)). When the dies are fastened together, a portion 37 of the surface of the third die 33 comes into contact with a portion 36 of the inner surface 32a of the second die 32. A hole 24 is formed in the portion 35 where the second die 32 (36) and the third die 33 (37) come into contact. A portion 37 of the surface of the third die 33 forms a pressure receiving surface that receives the die fastening pressure from the portion 36 (i.e., the pressing surface) of the inner surface 32a of the second die 32.

In the pressure receiving surface 37, angles $\theta_1$ and $\theta_2$ formed by the directions of the normal lines $N_1$ and $N_2$ (wherein $N_1$ and $N_2$ are directions heading towards the outer side of the third die 33) of the pressure receiving surface 37 relative to the pressing direction P (i.e., a downwards force in FIG. 4(a); a direction going from the second die 32 towards the first die 31) are obtuse angles (i.e., angles greater than 90° and less than 180°). If the angles $\theta_1$ and $\theta_2$ are 90°, the pressing direction becomes a direction running along the surface 37 of the third die 33 and the pressing force is unable to act. If the angles $\theta_1$ and $\theta_2$ are 180°, the height (i.e., the length in a vertical direction in FIG. 4(a)) of the portion 35 where the third die 33 and the second die 32 come into contact for forming the hole portion 24 ends up as zero, and a hole portion 24 having effective dimensions cannot be formed.

As a result, a component force of the die fastening pressure acts in a direction in which the second die 32 presses against the pressure receiving surface 37 of the third die 33.

When the molding die 30 is opened and the second die 32 is separated from the first die 31, the third die 33 slides in a direction such that it can be removed from the inner space 25 of the mounting portion 20 formed by molten resin injected into the cavity 34b.

In accordance with a normal injection molding method, the radiator grill 1 is manufactured by the following process. Firstly, each of the dies 31 to 33 forming the molding die 30 are assembled and fastened together. Next, a suitable molten resin such as ABS, PC, PP, or PC/ABS is injected into the cavities 34a and 34b formed inside the molding die 30. After the molding the molding die 30 is opened and the molded article is removed.

In this manner, according to the radiator grill that is resin molded component for a vehicle of the present embodiment, because it is possible to make the direction in which the slide die 33 for forming the mounting portion 20 is withdrawn a direction towards the vehicle exterior (i.e., downwards) that is perpendicular to the longitudinal direction of the radiator grill 1, it is possible to avoid display portions such as trade names and component numbers and to avoid protrusions such as reinforcing ribs and the like. Even if the mounting portions are placed in the vicinity of an end of the resin molded component in the longitudinal direction thereof, or even if they are placed in the vicinity of the center thereof, it is easy to set the withdrawal direction of the slide die and there are fewer design restrictions on the molded article, thereby allowing a greater degree of freedom in design.

Moreover, because it is possible to make the flow of molten resin for forming the joining portion 23 of the mounting portion 20 run in a direction parallel to the longitudinal direction of the radiator grill 1, it is possible to suppress molding defects such as sink marks and welds and the like in the periphery of the mounting portion 20, and a molded article can be manufactured at a high yield.

In particular, in the case of a resin molded component in which a high degree of decorativeness is aimed for by the provision of a glossy layer formed by a metallic thin film on the design surface using a plating, deposition, sputtering method or the like, it is difficult for minute distortions or fine linear grooves in the design surface to occur, and an aesthetically pleasing molded article having high levels of design and decorativeness can be manufactured.

Furthermore, according to the molding die 30 of the present embodiment, the fastening pressure from the first die 31 and the second die 32 that are positioned opposite each other acts on the pressure receiving surfaces 37 provided in the third die 33. As a result, entry of molten resin between portions 35 where the second die 32 and third die 33 are in contact is blocked, and slit shaped hole portions 24 are formed. Because the generation of burrs is effectively suppressed by the die fastening pressure, the cost incurred in removing the burrs from the hole portion 24 can be reduced.

The present invention is described above based on a preferred embodiment thereof, however, the present invention is not limited solely to these embodiments and various modifications thereof can be made insofar as they do not depart from the scope of the present invention.

The present invention can be applied to other resin molded components for a vehicle in addition to grills such as radiator grills, provided that such components are mounted adjacent to concave portions of a bumper or vehicle body in a state of normal use, and provide that a user does not touch an aperture portion of a mounting portion. In particular, an excellent effect is manifested when an aperture portion of a mounting portion of an elongated resin molded component faces a transverse direction (i.e., a direction orthogonal to the longitudinal direction) of the molded component.

Moreover, as the mounting structure provided on the mounting seat portion, in addition to a mounting hole (i.e., screw hole) into which the male thread of a screw is screwed, it is also possible to use a suitable known structure such as that described in JP-A No. 62-289449 in which the head portion of a male screw is held or a structure in which a clip is held.

As has been described above, according to the first aspect of the present invention, a mounting portion can be formed without any sinking ion the outer surface even when protrusions such as reinforcing ribs and display portions that display trade names and component numbers and the like by embossing and the like. It is also possible to provide mounting portions even in a configuration in which edges of both end portions in the longitudinal direction of a resin molded component protrude towards the rear surface side of the resin molded component. Moreover, mounting portions can also be formed even if the resin molded component is designed having, for example, a bow shaped configuration in the vicinity of the center portion in the longitudinal direction of the resin molded component so as to protrude towards the design surface side. Furthermore, because a joining portion is formed in substantially the same direction as the resin flow direction, there is no branching of the resin so that it is difficult for molding defects such as sink marks and welds and the like to occur. Accordingly, the yield is improved and costs can be reduced. Decorativeness gained from a glossy layer formed by a thin metallic film or the like can be manifested just as the designers intended, and an attractive molded component having no distortion in the design surface thereof can be obtained.

According to the second aspect of the present invention, in cases when edges 22a of side walls are made in the second die 32 and a large number of mounting portions are formed in the longitudinal direction of the molded component, because there is no need for the third die 33 to be able to slide in the longitudinal direction of the molded component, a large number of mounting portions can be formed in the longitudinal direction of the molded component.

According to the apparatus for manufacturing a resin molded component for a vehicle of the present invention, the resin molded component for a vehicle of the present invention can be efficiently produced using normal molding technology.

If a structure is employed in which the third die has a pressure receiving surface that receives pressing force from the second die, then pressing force generated when the first mold and second mold are fastened together acts on portions where the first die and second die are in contact, thereby suppressing the generation of burrs in the hole portions. As a result, the costs incurred in removing burrs from the hole portions can be reduced.

What is claimed is:

1. A resin molded component for a vehicle comprising:
   a molded component body having a design surface that forms an exterior surface when mounted on a vehicle body; and
   a mounting portion which is formed integrally with the molded component body, the mounting portion being formed so as to protrude from a rear surface that is on an opposite side from the design surface of the molded component body, wherein
   the mounting portion comprises:
   a mounting seat portion that is provided at a position separated from the molded component body by an inner space that communicates from an aperture portion formed in a direction orthogonal to a longitudinal direction of the resin molded component;
   a mounting structure provided on the mounting seat portion to be used to mount the resin molded component onto the vehicle body;
   a joining portion that joins the molded component body with the mounting seat portion at a position opposite the aperture portion; and
   side walls that surround a periphery of the inner space apart from the aperture portion and the joining portion, and that are separated from the molded component body by slit shaped hole portions that extend from the joining portion to an edge on the aperture portion side or to the vicinity thereof.

2. The resin molded component for a vehicle according to claim 1, wherein thicknesses of the side walls gradually become thinner closer to edges of the side walls that open onto the hole portion, and inner surfaces that open onto the inner space of the mounting portion and outer surfaces of the side walls are joined at the edges at an obtuse angle.

3. The resin molded component for a vehicle according to claim 1, said resin molded component being formed by injecting molten resin into a cavity enclosed by a first die and second die positioned facing each other, and by a third die that is positioned between the first die and second die such that a portion of the third die is in contact with an inner surface of the second die, wherein:
   the design surface is formed by an inner surface of the first die;
   the resin molded component is formed by a cavity formed between the first die and the second die or third die; and
   the slit shaped hole portions are formed by portions where the second die and the third die are in contact.

* * * * *

UNITED STATES PATENT AND TRADEMARK OFFICE
CERTIFICATE OF CORRECTION

| | | |
|---|---|---|
| PATENT NO. | : 7,166,350 B2 | Page 1 of 1 |
| APPLICATION NO. | : 10/810197 | |
| DATED | : January 23, 2007 | |
| INVENTOR(S) | : Murayama | |

It is certified that error appears in the above-identified patent and that said Letters Patent is hereby corrected as shown below:

On Title Page Item (73) Assignee: replace "Altis" with --Altia--.

Signed and Sealed this

First Day of May, 2007

JON W. DUDAS
*Director of the United States Patent and Trademark Office*